H. E. HAYWARD.
CHAIN LINK.
APPLICATION FILED JUNE 14, 1911.
1,009,510.
Patented Nov. 21, 1911.
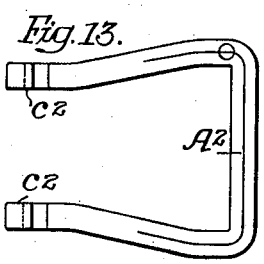
Fig. 13.
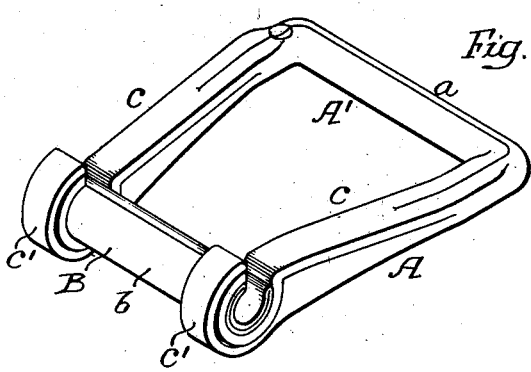
Fig. 1.
Fig. 5.
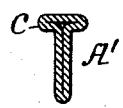
Fig. 6.
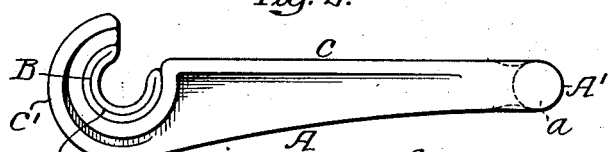
Fig. 2.
Fig. 7.
Fig. 9.
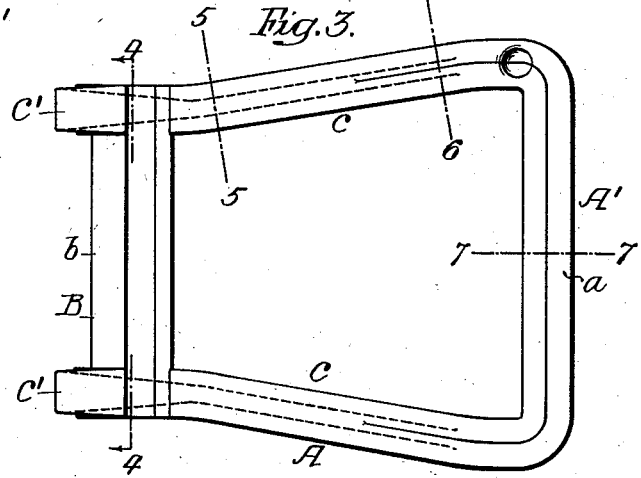
Fig. 3.
Fig. 10.
Fig. 12.
Fig. 11.
Fig. 8.
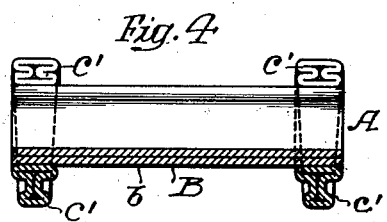
Fig. 4.
Witnesses—
Inventor.—
Henry E. Hayward.
by his Attorneys.—

UNITED STATES PATENT OFFICE.

HENRY E. HAYWARD, OF PHILADELPHIA, PENNSYLVANIA, ASSIGNOR TO LINK-BELT COMPANY, OF CHICAGO, ILLINOIS, A CORPORATION OF ILLINOIS.

CHAIN-LINK.

1,009,510.  Specification of Letters Patent.  Patented Nov. 21, 1911.

Application filed June 14, 1911. Serial No. 633,120.

*To all whom it may concern:*

Be it known that I, HENRY E. HAYWARD, a citizen of the United States, residing in Philadelphia, Pennsylvania, have invented certain Improvements in Chain-Links, of which the following is a specification.

My invention relates to certain improvements in chain links of the type in which the body is substantially rectangular and has an open center, at one end of the link is a cross bar, and at the opposite end of the link is a socket for the reception of the cross bar of an adjoining link.

The object of my invention is to make a link of this type from tubular material. The tube may be a closed tube, or one made from metal bent into shape with abutting edges.

In the accompanying drawing:—Figure 1, is a perspective view of a chain link made in accordance with my invention; Fig. 2, is a side view; Fig. 3, is a plan view; Fig. 4, is a transverse sectional view through the socket of the link on the line 4—4, Fig. 3; Fig. 5, is a sectional view of one of the side bars of the link on the line 5—5, Fig. 3; Fig. 6, is a sectional view on the line 6—6, Fig. 3; Fig. 7, is a sectional view of the cross bar of the link on the line 7—7, Fig. 3; Fig. 8, is a sectional view of the tube from which the link is made; Figs. 9, 10, 11 and 12, are sectional views showing different forms into which the tube may be bent in making the link; and Fig. 13, is a view illustrating another form of link made in accordance with my invention.

A is the body of the link, consisting of a cross bar $a$, a transverse socket $b$ for the reception of the cross bar of an adjoining link, and side members $c$, which connect the cross bar to the socket. The link is made in two sections; the body portion A′ consisting of the cross bar, two side members and the hooked portions $c'$, and the socket section B, which is secured to the body portion and extends from one hooked portion to the other of the link, as clearly illustrated in the drawings. In the present instance, both the body portion A′ and the socket portion B are made from tubular material. The tube from which the body portion is made is bent, as clearly shown in the drawings, to form the cross bar $a$ and side bars $c$, $c$. The bars $c$ nearest the bars $a$ are preferably made as illustrated in cross section, Fig. 6, and are formed near the sockets, as shown in Fig. 5.

In order to form the hooked members $c'$ the tube is crimped, as shown in Fig. 4, giving the link the form illustrated in Fig. 2. The socket member is made from a tube, one side of the tube being depressed and fitting snugly in the other side, as illustrated in Figs. 2 and 4. The socket section B in the present instance extends into the hooked portions and may be secured thereto by welding, or by other means.

In some instances, the socket member may terminate at the hooked member and be secured thereto by butt joints, but I prefer the construction illustrated in the drawing, as it materially strengthens the link and provides a smooth bearing surface throughout the length of the socket member.

While I have illustrated my invention as particularly adapted for manufacturing open rectangular links in which the socket section is secured to the body portion of the link, in some instances this socket member may be dispensed with, as illustrated in Fig. 13; the link consisting of a body $A^2$ having a cross bar and side bars, which are provided with hooks $c^2$ at their ends and these hooks are so shaped and so spaced apart as to accommodate the cross bar of an adjoining link.

I claim:—

1. An open rectangular link, having a tubular body portion and a tubular socket member.

2. An open rectangular link having a tubular body portion forming a cross bar and two side bars, said side bars having hooks at their free ends.

3. An open rectangular link having a tubular body portion forming a cylindrical cross bar and T-shaped side bars, each side bar having a crimped hook at its free end.

4. An open rectangular link having a tubular body portion forming a cross bar and two side bars, each side bar having a hook at its free end, with a tubular socket member having one-half depressed into the other half, said socket member resting in and attached to the hooks of the body portion.

In testimony whereof, I have signed my name to this specification, in the presence of two subscribing witnesses.

HENRY E. HAYWARD.

Witnesses:
WM. E. SHUPE,
WM. A. BARR.

Copies of this patent may be obtained for five cents each, by addressing the "Commissioner of Patents, Washington, D. C."